United States Patent [19]

Idogaki et al.

[11] Patent Number: 4,474,149

[45] Date of Patent: Oct. 2, 1984

[54] FLOW CONTROL VALVE APPARATUS

[75] Inventors: Takaharu Idogaki, Okazaki; Hisasi Kawai, Toyohashi; Kyo Hattori, Susono; Kazuhiro Sakurai, Gotenba, all of Japan

[73] Assignees: Nippon Soken, Inc.; Toyota Jidosha Kogyo Kabushiki Kaisha, both of Japan

[21] Appl. No.: 567,153

[22] Filed: Jan. 4, 1984

Related U.S. Application Data

[63] Continuation of Ser. No. 275,044, Jun. 18, 1981, abandoned.

[30] Foreign Application Priority Data

Jun. 20, 1980 [JP] Japan ................................. 55-82798

[51] Int. Cl.³ .............................................. F16K 11/085
[52] U.S. Cl. ................................... 123/308; 123/432; 137/624.18; 137/625.32
[58] Field of Search ................ 137/625.31, 599.1, 876, 137/624.11, 624.18, 625.28, 625.32; 123/308, 432; 251/133

[56] References Cited

U.S. PATENT DOCUMENTS

| | | | |
|---|---|---|---|
| 2,781,779 | 2/1957 | Kindl | 137/625.32 |
| 3,323,548 | 6/1967 | Ludwig | 251/133 |
| 4,135,119 | 1/1979 | Brosens | 310/36 |
| 4,345,737 | 8/1982 | Kawai | 251/129 |

FOREIGN PATENT DOCUMENTS

| | | |
|---|---|---|
| 53-92512 | 6/1978 | Japan . |
| 54-149928 | 11/1979 | Japan . |
| 55-15623 | 4/1980 | Japan . |
| 56-115508 | 9/1980 | Japan . |
| 56-124781 | 9/1981 | Japan . |

Primary Examiner—Martin P. Schwadron
Assistant Examiner—James R. Shay
Attorney, Agent, or Firm—Kenyon & Kenyon

[57] ABSTRACT

A valve apparatus for a solenoid drive type having a valve member in a housing defining an inlet port and first and second outlet ports. The valve member connects the inlet port to the second outlet port while closing the first outlet port when no electric current is received by the apparatus. The valve member controls the opening of the first outlet port while maintaining the second outlet port closed when an electric current larger than a predetermined offset value is applied to the apparatus. When the electric current is equal to the offset value, the valve member closes both the first and the second outlet ports.

12 Claims, 6 Drawing Figures

FLOW CONTROL VALVE APPARATUS

This application is a continuation of application Ser. No. 06/275,044, filed June 18, 1981, now abandoned.

FIELD OF THE INVENTION

The present invention relates to a valve apparatus for controlling the operation of an internal combustion engine, and in particular to a device for obtaining enough fluid to operate the engine, even if parts of the valve apparatus ice up during non-operating periods of the engine.

BACKGROUND OF THE INVENTION

In an internal combustion engine provided with an electronic fuel injection system an electric solenoid actuated flow control valve is conveniently used for controlling the amount of intake air when the cold engine is started, to compensate for changes in idling operation of the engine with the passage of the time, to correct idling fluctuations of the engine, or to compensate the idling variation when the engine is operating at high altitude. With reference to cold starting of the engine, the flow control valve operates to decrease a flow of air by-passing the intake pipe of the engine with increasing temperature of the engine.

When the engine is not operatine, the flow control valve is fully closed. However, this construction of the flow control valve suffers from the drawback that starting of the engine is often impossible at a very low atmospheric temperature, as low as −20° C.-30° C., because parts of the valve become locked by ice, so the valve remains fully closed even if an electric current is supplied to the solenoid mechanism. Therefore, no intake air can be introduced into the engine.

SUMMARY OF THE INVENTION

An object of the present invention is to provide a valve apparatus capable of permitting engine starting during such icing condition as well as providing the above-mentioned various control operations for compensation of the operations for compensation of the operations of the engine.

According to the present invention, this object is achieved by a valve apparatus which comprises: a housing assembly; inlet means for introduction of fluid into the housing; outlet means for removal of fluid from the housing; valve means arranged in the housing for controlling the amount of fluid directed from the inlet means to the outlet means, said valve means being actuable between a non-operating condition, in which a small amount of fluid can be passed through the apparatus, and an operating condition in which the amount of fluid passed through the apparatus can be controlled from zero value to maximum value; biasing means for urging the valve means to said non-operating condition; and electro-magnetic drive means responsive to an electric current applied thereto for actuating the valve means to the operating condition from the non-operating condition when the electric current is larger than a predetermined offset value.

DETAILED DESCRIPTION OF PREFERRED EMBODIMENTS

Figure 1:
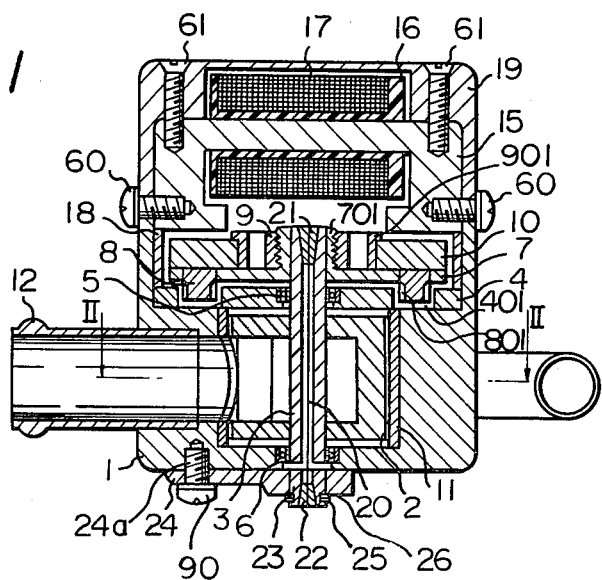
FIG. 1 is a cross-sectional view of a valve apparatus according to an embodiment of the present invention.
Figure 2:
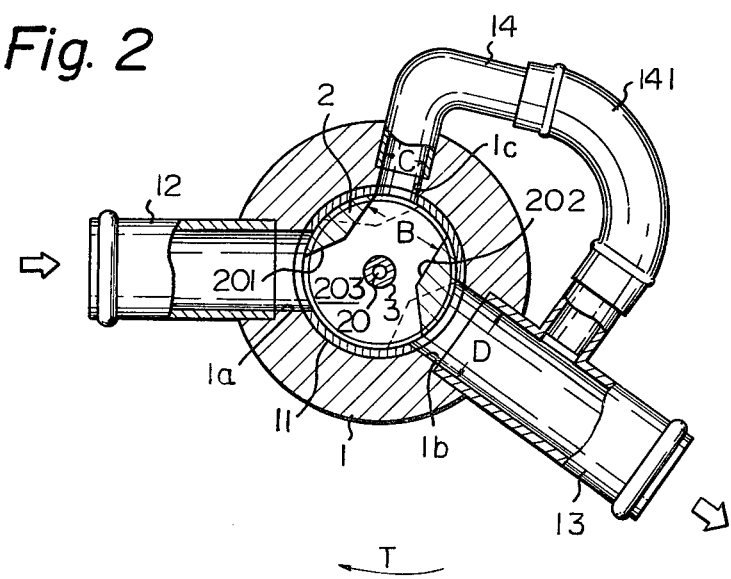
FIG. 2 is a cross-sectional view along the line II—II in FIG. 1.

In FIGS. 1 and 2, a valve housing 1 made of aluminum rotatably support a valve rotor 2. A tubular rotar shaft 3 made of stainless steel is press fitted to the rotor 2, and an aluminum plate 4 is fixed in the housing above the rotor 2. An upper end of shaft 3 is supported by plate 4 via a bearing unit 5, and a lower end of the shaft 3 is supported in the housing 1 by a bearing unit 6.

A stopper plate 7 made of a magnetic material is arranged above the plate 4 and is provided with an externally threaded central boss portion 701 into which the upper end of the shaft 3 is fitted. Stopper members 8 are press fitted and welded to the stopper plate 7. The plate 4 is provided with arcuate slots 401 into which the lower ends of corresponding stopper members 8 extend, said lower ends being covered by layers 801 of cushion material. A rotating permanent magnet 10 rests on the stopper plate 7, and a magnet holder 9 provided with an outer flange portion 901 is screwed onto the boss portion 701 of the plate 7 so that the flange portion 901 engages the top of the rotating magnet 10 to clamp the magnet member 10 to the stopper plate 7. The rotating magnet 10 is magnetized along the thickness thereof and has a pair of poles N and S at diametrically opposite positions as shown in FIG. 3.

As shown in FIG. 2 a valve bushing 11 of stainless steel is press-fitted into the housing 1, so that a small clearance is left between the bushing 11 and the valve rotor 2. An inlet pipe 12, an outlet pipe 13 having a diameter D substantially the same as that of the inlet pipe 12, and a by-pass pipe 14 of smaller diameter C are fixedly inserted into corresponding valve ports 1a, 1b and 1c of the housing 1. The by-pass pipe 14 is connected via a tube 141 made of rubber material to the outlet pipe 13.

The rotor 2 contains a first flared opening 201 via a passage 203 and a second straight opening 202 communicating with the first opening 201. The opening 201 is always in communication with the valve port 1a. As will be understood from the later description, rotation of the rotor 2 controls communication of the opening 202 with the valve port 1b or 1c.

Figure 3:
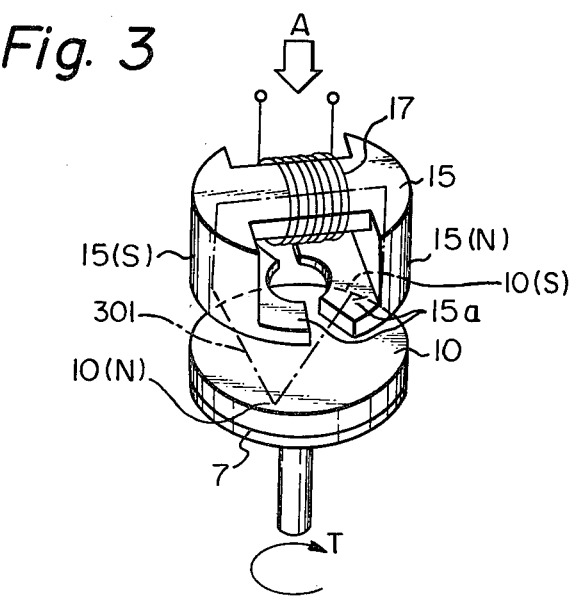
FIG. 3 is a diagrammatical perspective view indicating the solenoid operating mechanism of the valve in FIG. 1.

As shown in FIG. 3, a yoke 15 made of magnetic material has a pair of diametrically opposed flange portions 15a of substantially sector shape. A spool 16 (FIG. 1) made of non-magnetic material such as a phenolic resin surrounds the core of yoke 15, and a coil 17 is unidirectionally wound around the spool. Yoke 15 is fastened in the housing 1 by means of screws 60. A brass spacer ring 18 (FIG. 1) located between the yoke 15 and the plate 4 creates a predetermined gap between the sector portions 15a and the rotor magnet 10. A cap 19 of non-magnetic material is fixed to the yoke core 15 by means of screws 61.

When an electric current passes through the coil 17, the yoke 15 is magnetized so that one of the flange portions 15a becomes an N pole while the other flange portion 15a becomes an S pole. In this case, the yoke 15 and the rotor magnet 10 form a two pole electric motor of a type having an axial gap. As shown by a dash-dot line 301 in FIG. 3, a magnetic flux emerges from the N pole of the one flange portion 15a, crosses the axial gap to the S pole of the rotor magnet, continues to the diametrically, opposed N pole of the rotor magnet, and returns across the gap to the S pole of the other flange portion 15a. The N and S poles of the yoke 15 attract the opposite poles of the rotor magnet 10, causing the latter to rotate clockwise in the direction of arrow T in FIG. 3.

As shown by FIG. 1, a torsion bar 20 made as a fine stainless steel wire extending through a longitudinal bore of the shaft 3 and clamped by stainless steel collets 21 and 22 produces a torsional force opposing the electro-magnetic force generated by the two-pole motor composed of the rotor magnet 10 and yoke 15. Each of the collets 21 and 22 has a tapered outer surface and is made as slitted sleeve having a central opening through which the torsion bar 20 can pass. The shaft 3 has at its upper end a flared inner surface engaging the tapered outer surface of the collet 21. The upper end of the torsion bar 20 is easily introduced into the central hole of the holder 21 via the slit and is then fixedly connected to the shaft 3 by, the wedge effect between the collet 21 and the shaft 3.

A reference numeral 23 indicates a thrust holder of stainless steel which is inserted into an adjuster plate 24. The holder 23 has an inner tapered surface engaging the tapered outer surface of the collet 22 with a wedge action so that the lower end of the torsion bar 20 is fixedly connected to the thrust holder 23. A pair of parallel flat surfaces (not shown) on the periphery of holder 23 engage corresponding parallel flat inner surfaces formed in the plate 24 to prevent relative rotation between the holder 21 and the plate 24, and a snap ring 25 together with a shim 26 inserted into an annular groove formed on the holder 23 prevent it from being drawn upwardly. A locking and adjusting screw 90 screwed into the housing 1 passing through an elongated arcuate slit 24a in the adjusting plate 24 permits limited rotation of the plate to adjust the torsional force generated in the torsion bar 20, after which the screw 90 is tightened to lock the plate 24.

Figure 4:
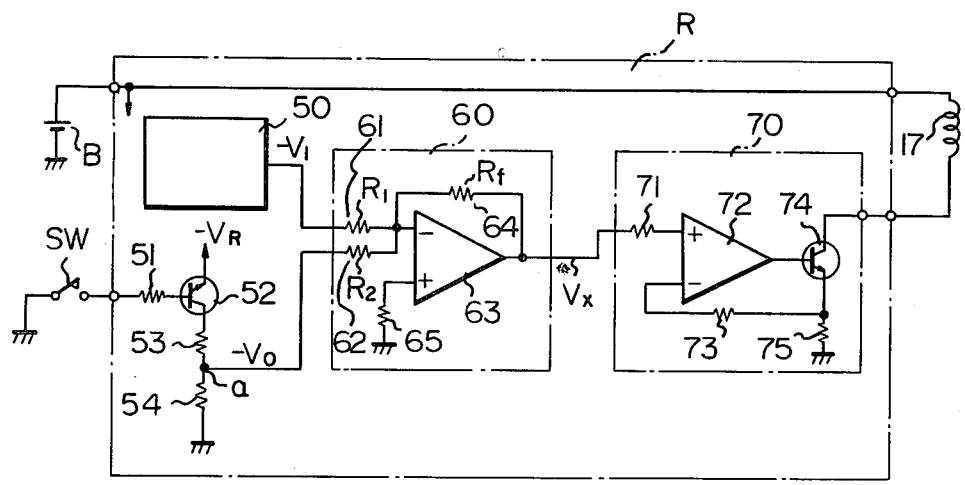
FIG. 4 is an electric circuit for operating the valve in FIG. 1.

FIG. 4 shows a control circuit R for providing an electric current to the coil 17 of the valve apparatus. The circuit R operates to provide an electric current I, which is the sum of a predetermined small value $I_0$ (off-set current to place the valve device in its closed condition) and a value $I_1$ which changes in accordance with the operating condition of the engine. In FIG. 4, reference numeral 50 indicates a microcomputer sub-control unit programmed to provide an electric signal of varying voltage level $-V_1$ in accordance with the various operating conditions of the engine. The unit 50 is well known to those skilled in this art and therefore, a detailed description is omitted.

A switch SW actuated in conjunction with an ignition switch of the engine is connected via a resistor 51 to the base of a transistor 52. A reference voltage $-V_R$ is applied to the emitter of transistor 52, and its collector is connected to ground via resistors 53 and 54 in series. Values of the resistors 53 and 54 are determined in such a manner that a voltage level at their common junction is equal to a predetermined value $-V_0$. This junction point is connected, via a resistor 62 to an inverting input of an operational amplifier 63.

The output of the sub-control unit 50, having a voltage $-V_1$, is also connected to the inverting input of the operational amplifier 63 via a resistor 61. A feed back resistor 64 is inserted between the output and the inverting input of the operational amplifier 63. The non-inverting input of amplifier 63 is connected to ground via a resistor 65. The operational amplifier 63 together with the resistor elements 61, 62, 64 and 65 forms an adding circuit 60.

The output of the operational amplifier 63 is connected to the non-inverting input of another operational amplifier 72, the output of which is connected to the base of a transistor 74. The emitter of transistor 74 is connected to ground via a resistor element 75 and to the inverting input of amplifier 72 via a resistor 73. The collector of transistor 74 is connected to one end of the coil 17, and the other end of the coil 17 is connected to a battery B. The operational amplifier 72 forms, together with the resistors 71, 73 and 75, and transistor 74, a constant current drive circuit 70.

It should be noted that reference voltage $-V_R$ for the control circuit R is provided by a power source and a constant voltage generator which are omitted from the drawing since they are well known to those skilled in this art.

When the switch SW is in its OFF condition, the voltage levels at the output of the control unit 50 and at the common junction point a of resistor 53 and 54 are both equal to zero. Consequently, the voltage level at the output of the adding circuit 60 is also equal to zero, so that no current flows from the output of the constant current drive circuit 70 through the coil 17.

When the switch is in its ON condition, the sub-control unit 50 is actuated and operates, as is well known to those skilled in this art, to provide an electric signal having a voltage level $-V_1$ which changes in accordance with operating conditions of the engine. At the same time, due to the ON condition of the switch SW, the transistor 52 is switched to the ON condition, so that a predetermined constant voltage $-V_0$ is generated at the point a. In this case, the voltage level at the output of the adding circuit 60 is, expressed by the following equation:

$$V_x = (R_f/R_1) \times V_1 + (R_f/R_2) \times V_0,$$

where $R_1$, $R_2$ and $R_f$ are the respective values of resistors 61, 62, and 64. This equation means that the adding circuit 60 provides a signal having a voltage level $V_x$ which corresponds to the sum of the varying voltage $-V_1$ from the subcontroller 50 and the constant voltage $-V_0$. Since the adding circuit 60 is connected to the constant current drive circuit 70, an electric current I is obtained at the output of the circuit 70 which is the sum of an electric current of fixed value $I_0$, corresponding to $V_0$ and an electric current of varying value $I_1$, corresponding to $-V_1$.

The operation of the herein-above described embodiment is as follows. When the engine is not operating, the switch SW of FIG. 4 is the OFF condition, the inputs of the operational circuit 63 are zero, no electric current flows through the coil 17 of the valve device, and no electro-magnetic force is generated between the yoke 15 and the rotor magnet 10. As a result, the valve rotor connected to the rotor magnet via the rotor shaft 3 is located at an angular position where no torsional force is generated in the torsion bar 20. This position of the valve rotor 2 is indicated by solid lines in FIG. 2. At this position the outlet opening 202 is aligned with the valve port 1c opened to by-pass pipe 14, so that a flow $q_1$ (FIG. 5) corresponding to the diameter of C can pass through the by-pass pipe 14 to output pipe 13.

When the switch is switched to the ON position due to the operation of the engine, the sub-control unit R delivers an electric current to the coil 17 of the valve apparatus, thereby generating an electro-magnetic force for rotating the magnet 10 as shown by the arrow T, against the torsional force of the bar 20. The electromagnetic force is proportional to the electric current, while the torsional force is proportional to angle of rotation, so the rotor magnet 10 reaches an equilibrium angular position where the electromagnetic force is equal to the torsional force. In other words, the rotor magnet 10 rotates through an angular displacement which is proportional to the electric current I. Since the rotor magnet 10 is integrally connected to the rotor valve 2 via the shaft 3, the rotor valve 2 effects the same rotational displacement as that of magnet 10; that is, the rotor valve 2 rotates in the direction of the arrow T as the electric current increases.

Figure 5:
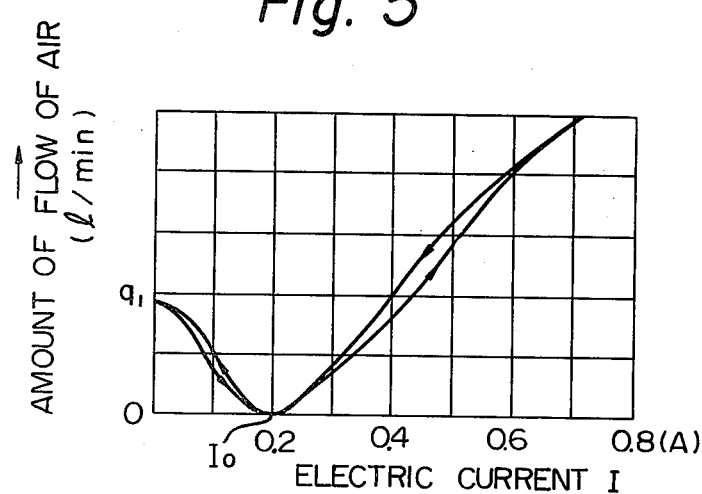
FIG. 5 shows a relationship between the electric current and the amount of flow of fluid in the valve apparatus according to the present invention.

When the sub-control unit 50 in FIG. 5 provides an output voltage $-V_1$ which is equal to zero, the adding circuit 60 provides the fixed voltage $-V_0$ so that a predetermined constant small current (off-set current) $I_0$ flows through the coil 17. The offset current $I_0$ is selected so that the valve rotor 2 moves from the solid line position to an offset position as shown by dotted lines in FIG. 2. In this off-set position both the output port 1b and the by-pass port 1c are disconnected from the opening 202, so that the valve device is fully closed position so that the amount of fluid passed through the valve is equal to zero, as shown in FIG. 5.

When the sub-control unit 50 provides an output voltage $-V_1$ which is not zero, an electric current which is the sum of the offset current $I_0$, which corresponds to $-V_0$, and $I_1$, which corresponds to $-V_1$, flows through the coil 17. The valve rotor 2 is further turned in the direction of arrow T from the dotted line position in FIG. 2, so that the outlet port 1b is opened to the opening 202 of the rotor 2 to allow the connection with the opening 201 opened to the inlet port 1a. This permits flow from the inlet 12 to the outlet port 13. The amount is determined by the flow area formed between the opening 202 and the port 1b. As the electric current increases, the rotor is rotated further for increasing the flow area. Therefore, the flow through the valve device increases as the electric current increases to valves larger than $I_0$, as shown by FIG. 5. By selecting the shapes of the openings 201 and 202 as well as the shape of the opening of the valve ports 1a, 1b and 1c adjacent the rotor a desired relationship can be obtained between the flow area and the angular displacement of the rotor valve 2. In other words, a desired relationship can be obtained between the value of electric current I passed through the coil 17 and the flow directed to the output 13 from the inlet 12. For example, the amount of fluid can be increased proportionally in accordance with the increase in the electric current above $I_0$, as shown by FIG. 5.

The embodiment shown in FIG. 1 uses as a spring means for opposing the electro-magnetic rotational force a torsion bar 20 which is housed in the rotating shaft 3. The advantages of this design are that the volume occupied by the spring 20 is negligible and that friction is substantially eliminated, since the torsional bar has no moving contact with other parts. When the valve is installed in the intake duct of an engine, and the engine is shut down for a long time under very cold conditions icing can occur so that the rotor 2 is rigidly connected to the housing 1. In this case the rotor 2 cannot be moved even if an electric current is introduced into the coil 17. However, a small amount of air flow ($q_1$ in FIG. 5) will pass through the valve apparatus, since the valve rotor 2 was left in the slightly opened bypass condition shown by the solid lines in FIG. 2 upon the previous stopping of the engine. Thus, the engine may be started irrespective of the occurence of the icing. After starting, the icing is progressively overcome by the warm temperature of the engine and also since the valve apparatus is itself warmed up by the passing of the control electric current.

Figure 6:
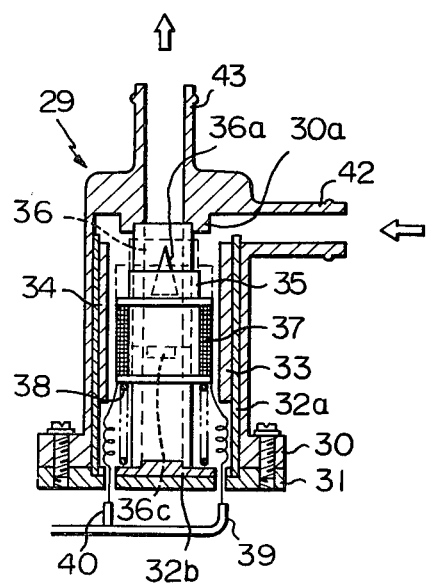
FIG. 6 shows a cross-sectional view of a flow control valve according to another embodiment of the present invention.

FIG. 6 shows an application of the present invention to a spool type valve apparatus. The valve apparatus includes a housing having parts 30 and 31 connected to each other by screw means. A tubular support member 36 made of magnetic material is arranged in the housing. The upper end of member 36 abuts a boss portion 30a formed in the housing part 30. The lower end of the member rests on a disc shaped support member 32b fixedly connected to the housing part 31. Two permanent magnets 33 and 34, each having an arc shaped cross-section, are bonded to a tubular pole piece 32a inside the housing in an opposed relationship. The magnets 33 and 34 have N poles on the inner surfaces and have S poles on the outer surfaces. A spool valve 35 is slidably mounted on the tubular support member 36. A coil 37 is wound about the spool valve 35, which is urged upwardly by means of a spring 38. The coil 37 is connected to the control circuit R as shown in FIG. 4 via respective lead wires 39 and 40. The tubular support member 36 is provided near its upper end with a pair of opposed slits 36a of triangle shape and near its lower end with a pair of opposed slits 36c of rectangular shape. The opening of slits 36a is controlled to control the flow directed from the inlet pipe 42 to the outlet pipe 43 in accordance with the position of the spool valve 35 with respect to the shaft 36. The amount of flow is proportional to a root of the area of opening of the slits 36a.

Since it is assumed that inner surfaces of the magnets 33 and 34 have N poles while the outer surfaces of the magnets 33 and 34 have S poles, a magnetic flux coming out from the inner N poles of the magnets 33 and 34 passes through the tubular support member 36, the disc shaped support member 32b and the tubular pole piece 32a to the outer S poles of the magnets 33 and 34. Thus a radial magnetic field extends across the gap between the inner sides of the magnets 33 and 34 and the tubular support member 36.

When an electric current from control circuit R is passed through the coil 37, a downwardly directed electro-magnetic force is generated to move the spool 35 downward to a position where the electromagnetic force is balanced by the force of the spring 38.

Since the electromagnetic force is proportional to the electric current I through the coil and the force of the spring 38 is proportional to the displacement, the displacement of the spool 35 is proportional to the electric current I. Since the amount of flow is proportional to the root of the opening of the slit 36a, the amount of electric current to be supplied is also proportional to the root of the area of slit 36a.

When no electric current passes through the coil 37, the spool valve 35 is urged by spring 38 to its uppermost position, shown by the dotted lines, where the slit 36a is closed while the slit 36c is opened. Thus flow can pass through the slit 36c in an amount $q_1$ which corresponds to the area of the slit 36c. When the electric current is equal to the offset value $I_0$, the spool valve 35 is moved slightly downward to a position where the slit 36a as well as the slit 36c are both closed. At this point, the amount of flow becomes zero, as shown by FIG. 5. When the amount of the electric current is larger than the offset value I, the spool valve 35 moves further down to open the slit 36a in proportion to the electric current, while the slit 36c is maintained to be closed.

Assuming the valve of FIG. 6 is installed in the intake passage of an engine, since the slit 36c is opened when the engine is shut down, a small amount of air can be passed through the slit 36c upon restarting the engine even if the movement of the spool valve 35 is blocked due to the occurrence of icing.

While the invention has been described with reference to the attached drawings, many modifications and changes may be made by those skilled in this art.

We claim:

1. A valve apparatus for use in an intake air bypass passage of an internal combustion engine, the valve apparatus comprising:
   a housing having a cylindrical bore therein, a first port opening into the cylindrical bore, and second and third ports opening into the cylindrical bore in angularly spaced relation to each other;
   a valve member disposed in the cylindrical bore and having a passage therethrough with an inlet end communicating with the first port and an outlet end;
   means for supporting the valve member for rotation coaxially in said cylindrical bore from a first non-actuated position, in which the outlet end of the passage communicates with said second port, in one direction through a second intermediate position, in which the outlet end of the passage is closed, to a third position, in which the outlet end of the passage communicates with the third port;
   spring means operatively coupled between said valve member and said housing for rotationally biasing the valve member toward said first non-actuated position; and
   electromagnetic drive means responsive to an electric current applied thereto for rotating the valve against the force of the spring means to an operating condition between the second intermediate position and the third position when the electric current is at least equal to a predetermined offset value.

2. A valve apparatus according to claim 1, wherein said electromagnetic drive means comprises a rotor magnet fixedly connected to the valve member, bearing means for rotatably supporting the rotor magnet in the housing, and solenoid means fixed in the housing for generating an electromagnetic force to rotate the rotor magnet against the force of the biasing spring.

3. A valve apparatus according to claim 2, wherein said means for supporting the valve member comprises a tubular shaft press fitted into the valve member and rotatably supported in the housing, said shaft being fixedly connected to the rotor magnet, and said spring biasing means comprises a torsion bar in the form of a thin metallic wire, first locking means for connecting one end of the torsion bar to one end of the tubular shaft, and second locking means for connecting the other end of the torsion bar to the housing.

4. A valve apparatus comprising:
   a housing;
   an inlet pipe for introducing fluid into the housing;
   an outlet pipe for discharging fluid from the housing;
   valve means arranged in the housing for controlling the amount of fluid flow from the inlet means to the outlet means, said valve means being operable between a non-actuated condition wherein a small amount of fluid can pass through the apparatus, and an operating condition wherein an amount of fluid passing through the apparatus can be controlled by the valve means from zero value to maximum value;
   biasing means for urging the valve means to said non-actuated condition;
   electromagnetic drive means responsive to an electric current applied thereto for generating an electromagnetic force for actuating the valve means to the operating condition from the non-actuated condition when the electric current is at least equal to a predetermined offset value;
   said valve means comprising a valve rotor rotatably mounted in the housing and operatively connected to the electromagnetic drive means, said valve rotor having a passage for fluid therethrough, said housing having a cylindrical bore in which the valve rotor is rotatably arranged, an inlet port connected to the inlet pipe, a first outlet port of large diameter connected to the outlet pipe, and a second outlet port of small diameter connected to the outlet pipe, both the inlet and outlet ports being open to the cylindrical bore, said valve rotor, when in the non-actuated position, communicating via the passage the inlet port with the second outlet port while maintaining the first outlet port closed, and said valve rotor controlling, when in the operating condition, communication via the passage between the inlet port and the first outlet port such that the flow area of the first outlet port varies in accordance with angular displacement of the valve rotor while the valve rotor maintains the second outlet port closed;
   said electromagnetic drive means comprising a disk-shaped diametrically magnetized rotor, bearing means for rotatably supporting the rotor in the housing, and a solenoid coil for generating an electromagnetic force to rotate the rotor against the force of the biasing means;
   said bearing means comprising a tubular shaft press fitted into the valve rotor and rotatably supported in the housing, said shaft being fixedly connected to the rotor;
   said biasing means comprising a torsion bar in the form of a thin metallic wire, first locking means for connecting one end of the torsion bar to one end of the tubular shaft, and second locking means for connecting the other end of the torsion bar to the housing; and
   said first locking means comprising a tapered slit sleeve wedgingly fitted into a complementary opening at the one end of the shaft.

5. A valve apparatus according to claim 4, wherein said second locking means comprises a tapered slit sleeve wedgingly fitted into a complementary opening in the housing.

6. A valve apparatus according to claim 5, wherein said biasing means further comprises means for turning the second locking means with respect to the housing for adjusting the torsional force exerted by the torsion bar, and screw means for fixing the turning means to a selected angular position with respect to the housing.

7. A system for controlling the amount of flow of air in an intake bypass passage of an internal combustion engine, the system comprising:

a housing;

inlet means for introduction of air from a main intake passage of an internal combustion engine upstream of a throttle valve to the housing, said inlet means including an inlet port in the housing;

outlet means for discharge of air from the housing to the main intake passage of said internal combustion engine downstream of said throttle valve, said outlet means including first and second spaced-apart outlet ports in the housing, the first outlet port being smaller than the inlet port and the second outlet port being as large as the inlet port;

valve means arranged in the housing for controlling the amount of fluid flow from the inlet means to the outlet means, said valve means being movable from a first position in which the inlet port communicates via the valve means with the first outlet port, said first position corresponding to a non-actuated condition wherein a small amount of fluid can pass through the system, in one direction through an intermediate position in which the valve means prevents communication between the inlet port and the first and second output ports to a second position in which the inlet port communicates fully with the second outlet port, the region of valve movement between the intermediate position and the second position corresponding to an operating condition wherein an amount of air which can pass through the system is controlled from zero value to maximum value in accordance with movement of the valve;

biasing means for urging the valve means to the non-actuated condition;

electromagnetic drive means connected to the valve means and responsive to an electric current applied thereto for actuating the valve means to the operating condition when the electric current is at least equal to a predetermined offset value sufficient to move the valve means to said intermediate position, the valve being fully closed when the current is equal to the offset value, and the valve being opened in accordance with increasing current above the offset value; and an electric circuit providing an electric current which is the sum of the offset value and a variable value which increases from zero value in accordance with the desired opening condition of the valve.

8. A system according to claim 7, wherein said electric circuit comprises a controller for providing a variable electric signal, means for providing a predetermined fixed voltage, means for providing an electric signal having a voltage which is the sum of the variable voltage from the controller and the predetermined fixed voltage, and means for providing an electric current which corresponds to the voltage of said electric signal.

9. A valve apparatus comprising:

a housing;

an inlet pipe for introducing fluid into the housing;

an outlet pipe for discharging fluid from the housing;

said housing having therein a cylindrical bore, a first port communicating with said inlet pipe and opening to said cylindrical bore, and a second port and a third port communicating with said outlet pipe and opening to said cylindrical bore;

a rotary valve rotatably disposed in said cylindrical bore, said rotary valve having a passage connected to said first port;

a disc-shaped diametrically magnetized permanent magnet;

a shaft rotatably mounted in the housing means, the rotary valve as well as the disc-shaped magnet being fixed to the shaft;

spring means operatively coupled between the housing and said rotary valve for biasing the valve in one rotational direction; and an electromagnetic coil fixed to said housing for generating an electromagnetic force to urge said permanent magnet in the other rotational direction opposite said one direction;

said rotary valve being held at an initial position by said spring means when no electromagnetic force is generated by said electromagnetic coil, where said second port is closed and said third port is opened by said rotary valve so that fluid can pass through said third port;

said rotary valve being rotatable from said initial position in the other direction in response to increasing electromagnetic force generated by said coil so that the flow area of said third port is gradually decreased while said second port is kept fully closed by said rotary valve until said rotary valve is rotated to a second position, wherein the valve closes the second and the third port;

said rotary valve being further rotatable in the other rotational direction from the second position in response to increasing magnitude of said electromagnetic force so that the opening area of said second port is gradually opened and increased while said third port is kept fully closed by said rotary valve.

10. A valve apparatus according to claim 9 wherein said second port has a cross-sectional area substantially equal to that of the first port and wherein the third port has a cross-sectional area smaller than that of the first port.

11. A valve device according to claim 9 wherein said rotary shaft is of a hollow shape, and wherein said spring means comprises a torsion bar extending through the shaft, one end of the bar being connected to the housing, the other end of the bar being connected to the shaft.

12. A valve device according to claim 9, further comprising a bypass pipe located outside of the housing, one end of the bypass pipe being connected to the third port, the other end of the bypass pipe being connected to the outlet pipe.

* * * * *

UNITED STATES PATENT AND TRADEMARK OFFICE
CERTIFICATE OF CORRECTION

PATENT NO. : 4,474,149
DATED : October 2, 1984
INVENTOR(S) : Idogaki et al

It is certified that error appears in the above-identified patent and that said Letters Patent is hereby corrected as shown below:

On the title page;

Abstract, line 1, change "for" to --of--.

Column 1, line 18, change "conveniently" to --conventionally--.

Signed and Sealed this

Sixteenth Day of July 1985

[SEAL]

Attest:

DONALD J. QUIGG

*Attesting Officer*     *Acting Commissioner of Patents and Trademarks*